March 17, 1970  A. L. HUBBARD  3,500,570
FISHING ROD PUMP ASSEMBLY
Filed Sept. 16, 1968
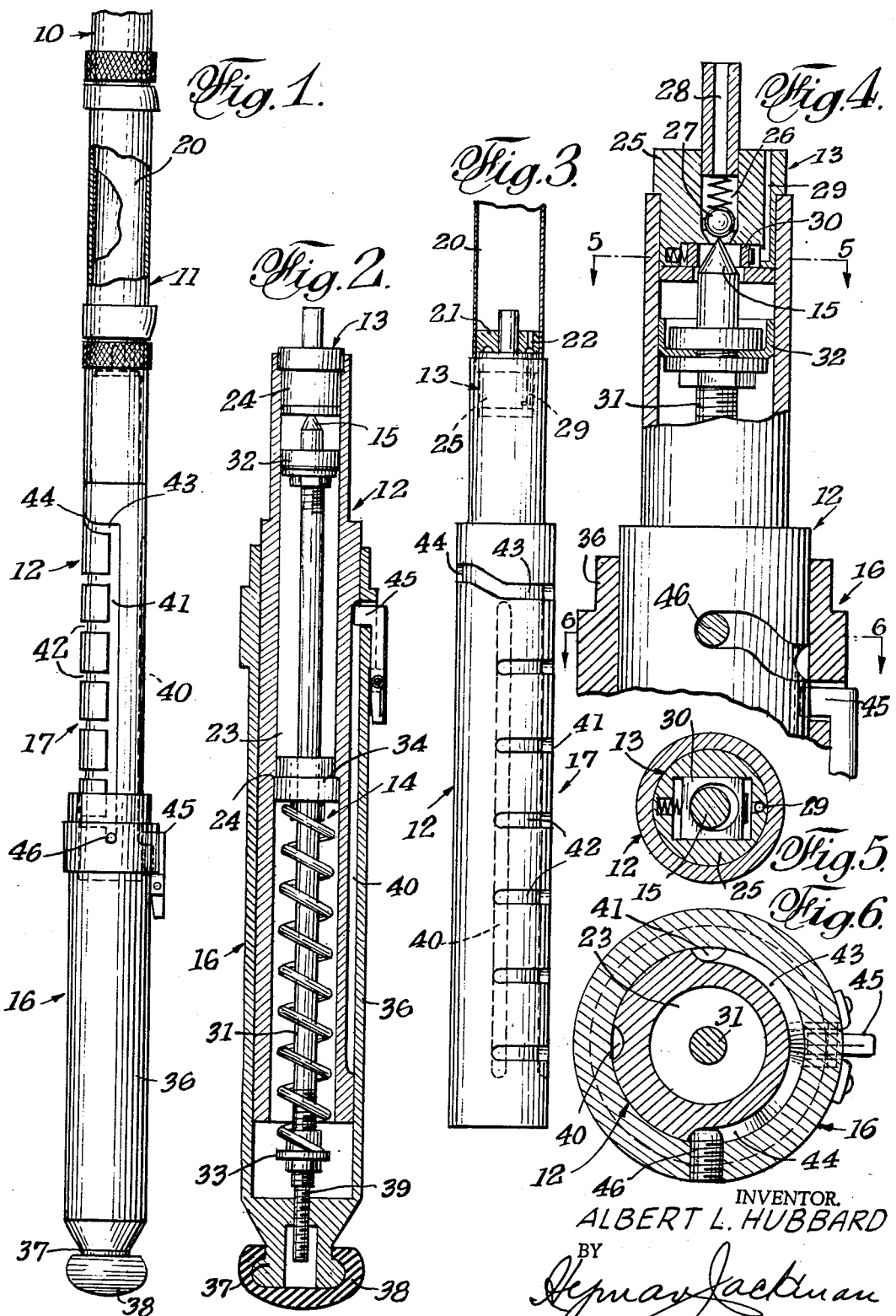
INVENTOR.
ALBERT L. HUBBARD
BY
ATTORNEY

United States Patent Office

3,500,570
Patented Mar. 17, 1970

3,500,570
FISHING ROD PUMP ASSEMBLY
Albert L. Hubbard, 677 E. Channel Island Blvd.,
Oxnard, Calif. 93030
Filed Sept. 16, 1968, Ser. No. 762,227
Int. Cl. A01k 87/00
U.S. Cl. 43—18         4 Claims

ABSTRACT OF THE DISCLOSURE

A hollow fishing rod provided with a single-action air pump incorporated in the handle thereof for filling the hollow of the rod with air under internal pressure to regulate the degree of flexibility of the rod according to said internal pressure, and means providing a position of the pump to vent said rod hollow either partly or totally.

BACKGROUND OF THE INVENTION

The flexibility of conventional fishing rods cannot be varied. Fishing conditions and types, sizes and power of the fish being fished for vary in wide ranges. Therefore, conventional rods cannot adapt to such variations and the results achieved vary accordingly. The ability to adjust the flexibility of the rod according to particular conditions, as above, constitutes an important object of the present invention.

Another object of the invention is to provide simple and efficient manual pump means embodied in the handle of a hollow fishing rod, having the dual purpose of pressurizing the rod to a desired degree to lessen its flexibility accordingly, and to vent or partly vent the rod to increase its flexibility accordingly.

The applicant has no knowledge of a fishing rod having the above-discussed ability to have its flexibility increase and decrease.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

SUMMARY OF THE INVENTION

The invention is based on a fishing rod that has a hollow length of rod 10 which, when under atmospheric pressure, has a constant pressure, and is optionally provided with a reel seat 11 which connects the rod 10 to a cylinder 12, a check valve assembly 13 mounted on the end of the cylinder that joins the reel seat, a plunger assembly 14 operable in the cylinder 12 and provided with an end 15 for opening said valve assembly to vent the hollow of the rod 10, a reciprocative handle 16 for projecting the plunger assembly to force air into the rod 10, and means 17 interengaging the cylinder 12 and the handle 16 to guide the operative movement of the latter.

BRIEF DESCRIPTION OF THE DRAWING

In the drawing, like reference characters designate similar parts in the several views.

FIG. 1 is an elevational view, in extended position, of a fishing rod pump assembly according to the present invention.

FIG. 2 is an enlarged longitudinal sectional view thereof in normally retracted position.

FIG. 3 is an elevational view of the cylinder of the assembly.

FIG. 4 is a further enlarged longitudinal sectional view of the upper end portion of FIG. 2.

FIGS. 5 and 6 are cross-sectional views taken, respectively, on lines 5—5 and 6—6 of FIG. 4.

DESCRIPTION OF THE PREFERRED EMBODIMENT

Except that the rod 10 is tubular and, perhaps, desirably reinforced, the same may be otherwise conventional in diametral size and length as well as taper. The same should be airtight; or a bladder 20 may be placed therein to insure a sealed assembly. In the latter case, an end plug 21, provided with a port 22, is provided for passing air into or out of the bladder, pressurizing the rod 10 accordingly.

The reel seat 12 is generally conventional and when used comprises the connector between the rod 10 and the cylinder 12. The manner of such connection is not material to this invention.

The cylinder 12 is formed to have a longitudinal bore 23 having therein an intermediate shoulder 24 directed toward the end away from the rod 10. The outer surface of said cylinder is preferably cylindrical.

The valve assembly 13 is shown as a body 25 fitted to the end of the cylinder 12 to which the reel seat 11 is attached or, if said seat is omitted, to the end of the rod 10. A passage 26 in said body is normally closed by a check valve 27 which, when unseated, allows passage of air, in either direction, through the passage 25 and through an extension 28 thereof. A vent passage 29, that is normally retained closed by a spring-biased slide 30, opens into the hollow of the rod 10 or the bladder 20, as the case may be, and vents to atmosphere in any suitable way.

The plunger assembly 14 comprises a stem 31 disposed longitudinally in the cylinder bore 23, a cup-type piston or plunger 32 at the end of said stem located below the valve-opening end 15, a spring abutment 33 adjustably provided on the opposite end of the stem, an intermediate spring abutment 34 engaged with the shoulder 24, and a coil spring 35 around the stem, between the abutments 33 and 34, to retractively bias the stem 31 and the cup 32 thereon. The open side of the cup faces toward the check valve so that, on projection of the stem, the cup will exert air pressure in a direction to force the valve 27 and enter the hollow rod 10.

The handle 16 comprises a tubular member 36 with a closed end projection 37 on which a non-metallic cap 38 is removably fitted. An adjustable stop screw 39 extends from the projection toward the adjacent end of the stem 31, the same, with the handle telescopically engaged over the cylinder 12, moving the stem and the cup 32 thereon in the mentioned rod-pressurizing direction when said handle is contracted from the extended position of FIG. 1 to that of FIG. 2.

The means 17 is shown as a longitudinal groove 40 in the cylindrical face of the cylinder 12, a second longitudinal groove 41 phased 90° from the groove 40, a plurality of circumferentially arcuate grooves 42 extending in longitudinally spaced relation 90° from the latter groove in a direction away from the groove 40, an additional arcuate groove 43, similar to the grooves 42 and located nearest the end of the cylinder 12 that carries the valve assembly 13, an upwardly offset extension 44 on said groove 43, and a retractable detent 45 on the handle 16 for selective engagement with the grooves 40 and 41 nd, through the latter, with the grooves 42 and 43 and the offset extension of the latter.

An inner projection 46, in the form of a set screw provided in the upper portion of the handle 16, is engaged in the groove 41 when the detent 45 is engaged in the groove 40. The latter may be withdrawn from groove 40 and, by relative rotation of the cylinder 12 and handle 16, engaged with the groove 41 and, from that position, adapted for engagement with any of the arcuate grooves 42 and 43.

The stop screw 39 is adjusted so that, with the detent 45 engaged in groove 40, the handle 16 may be reciprocated between the ends of said groove to cause the piston cup 32, on each projection stroke, to direct air under the pressure of the piston past the check valve 27 and into the hollow rod 10 or the bladder 20 within such a rod. When the desired flexibility of the rod 10 is attained, the detent 45 is withdrawn from said groove 40 and entered into groove 41, in which position it may travel the length of groove 41 or be entered into any of the grooves 42 or 43 to lock the cylinder and handle against relative movement, thereby retaining the air in the rod 10 at the pressure providing desired flexibility of said rod.

Since the stem end 15 does not encounter either the slide 30 or the check valve 27 during normal pumping of air into the fishing rod, the vent 29 remains closed and the valve, at each recovery stroke of the handle 16, automatically closes, said valve opening only during the power stroke during the air-pumping operation.

When it is desired to vent the rod 10, either partly to increase flexibility, or totally, the cylinder and handle are relatively rotated to cause the projection 46, from a position in the frame 43, to enter the offset extension 44 of the groove 43. Now, the handle 16 may be further projected than before, thereby causing the end 15 of the stem 31 to first encounter and shift the slide 30 to open the vent 29, and then, unseat the check valve 27 to open the passage 26 and enable rapid discharge of the pressure air from the fishing rod.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. A fishing rod pump assembly comprising:
   (a) a hollow rod,
   (b) an elongated cylinder extending from an end of said rod,
   (c) a check valve at the inlet to the hollow of the rod and normally closing said hollow,
   (d) a manually reciprocative handle telescopically engaged with the cylinder,
   (e) a plunger assembly in said cylinder provided with an air-compressing piston and operatively engaged with the handle to reciprocate and move the piston reciprocatively to pump air past the check valve into the hollow of the rod to lessen the flexibility of the rod according to the pressure in said hollow, and
   (f) means interconnecting the cylinder and the handle to releasably lock the same to each other at the end of an air-pumping operation,
   (g) the cylinder and handle interconnecting means comprising:
      (1) a retractable detent carried by the handle and normally engaged in a longitudinally disposed groove in the cylinder,
      (2) a second longitudinally disposed groove in the cylinder circumferentially spaced from the first groove and receptive of said detent after retraction thereof from engagement in said first groove and register with the second groove by relative rotation of the cylinder and handle,
      (3) a plurality of circumferentially arcuate grooves extending from the second groove and longitudinally spaced along the cylinder, and
      (4) a projection on the handle extending into engagement with said second groove when the detent is in the first groove, and engaged in one of said arcuate grooves to lock the handle against reciprocative movement relative to the cylinder when the detent is engaged in said second groove.

2. A fishing rod pump assembly comprising:
   (a) a hollow rod,
   (b) an elongated cylinder extending from an end of said rod,
   (c) a check valve at the inlet to the hollow of the rod and normally closing said hollow,
   (d) a manually reciprocative handle telescopically engaged with the cylinder,
   (e) a plunger assembly in said cylinder provided with an air-compressing piston and operatively engaged with the handle to reciprocate and move the piston reciprocatively to pump air past the check valve into the hollow of the rod to lessen the flexibility of the rod according to the pressure in said hollow,
   (f) means interconnecting the cylinder and the handle to releasably lock the same to each other at the end of an air-pumping operation,
   (g) a vent passage open to the hollow of the rod,
   (h) means normally closing said passage both during and after a pumping operation, and
   (i) an extension on the plunger on the end thereof between the piston and the check valve to engage and move the passage-closing means to open said passage and thereby vent the hollow of the rod.

3. A fishing rod pump assembly as defined in claim 1 in which the arcuate groove nearest the end of the cylinder that is connected to the hollow rod is provided with a circumferential extension that is offset in a direction toward said rod, the projection on the handle, when entered into said offset extension, increasing the pumping stroke of the handle.

4. A fishing rod pump assembly as defined in claim 2 in which the extension is sufficiently long to engage and open the check valve after it has operated the passage-closing means.

References Cited

UNITED STATES PATENTS 2,773,494  12/1956  Thompson et al. _____ 124—15

FOREIGN PATENTS 754,932  8/1956  Great Britain.

WARNER H. CAMP, Primary Examiner